(12) United States Patent
Robles (10) Patent No.: US 9,158,579 B1
(45) Date of Patent: Oct. 13, 2015

(54) SYSTEM HAVING OPERATION QUEUES CORRESPONDING TO OPERATION EXECUTION TIME

(75) Inventor: David Morgan Robles, Alameda, CA (US)

(73) Assignee: NetApp, Inc., Sunnyvale, CA (US)

( * ) Notice: Subject to any disclaimer, the term of this patent is extended or adjusted under 35 U.S.C. 154(b) by 1844 days.

(21) Appl. No.: 12/268,037

(22) Filed: Nov. 10, 2008

(51) Int. Cl.
*G06F 9/455* (2006.01)
*G06F 9/46* (2006.01)
*G06F 9/48* (2006.01)

(52) U.S. Cl.
CPC ............ *G06F 9/4881* (2013.01); *G06F 9/4843* (2013.01)

(58) Field of Classification Search
None
See application file for complete search history.

(56) References Cited

U.S. PATENT DOCUMENTS

| | | |
|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,365,332 A | 12/1982 | Rice |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,022,080 A | 6/1991 | Durst et al. |
| 5,077,736 A | 12/1991 | Dunphy, Jr. et al. |
| 5,088,081 A | 2/1992 | Farr |

(Continued)

FOREIGN PATENT DOCUMENTS

EP          1617330 A2       1/2006

OTHER PUBLICATIONS

Bultman, David L., High Performance SCSI Using Parallel Drive Technology, In Proc. BUSCON Conf., pp. 40-44, Anaheim, CA, Feb. 1988.

(Continued)

*Primary Examiner* — Corey S Faherty
(74) *Attorney, Agent, or Firm* — Cesari and McKenna, LLP (57) ABSTRACT

A system and method for prioritized queues is provided. A plurality of queues are organized to enable long-running operations to be directed to a long running queue operation, while faster operations are directed to a non-long running operation queue. When an operation request is received, a determination is made whether it is a long-running operation, and, if so, the operation is placed in a long-running operation queue. When the processor core that is executing long-running operations is ready for the next operation, it removes an operation from the long-running operation queue and processes the operation.

17 Claims, 6 Drawing Sheets

(56) References Cited

U.S. PATENT DOCUMENTS

| | | |
|---|---|---|
| 5,101,492 A | 3/1992 | Schultz et al. |
| 5,128,810 A | 7/1992 | Halford |
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,200,999 A | 4/1993 | Matyas et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,274,799 A | 12/1993 | Brant et al. |
| 5,305,326 A | 4/1994 | Solomon et al. |
| 5,313,626 A | 5/1994 | Jones et al. |
| 5,319,710 A | 6/1994 | Atalla et al. |
| 5,351,246 A | 9/1994 | Blaum et al. |
| 5,355,453 A | 10/1994 | Row et al. |
| 5,386,524 A | 1/1995 | Lary et al. |
| 5,398,283 A | 3/1995 | Virga |
| 5,410,667 A | 4/1995 | Belsan et al. |
| 5,485,579 A | 1/1996 | Hitz et al. |
| 5,504,861 A | 4/1996 | Crockett et al. |
| 5,537,567 A | 7/1996 | Galbraith et al. |
| 5,579,475 A | 11/1996 | Blaum et al. |
| 5,592,618 A | 1/1997 | Micka et al. |
| 5,623,595 A | 4/1997 | Bailey |
| 5,657,440 A | 8/1997 | Micka et al. |
| 5,682,513 A | 10/1997 | Candelaria et al. |
| 5,778,206 A | 7/1998 | Pain et al. |
| 5,802,366 A | 9/1998 | Row et al. |
| 5,805,788 A | 9/1998 | Johnson |
| 5,812,753 A | 9/1998 | Chiariotti |
| 5,815,693 A | 9/1998 | McDermott et al. |
| 5,819,292 A | 10/1998 | Hitz et al. |
| 5,852,664 A | 12/1998 | Iverson et al. |
| 5,862,158 A | 1/1999 | Baylor et al. |
| 5,884,098 A | 3/1999 | Mason, Jr. |
| 5,918,001 A | 6/1999 | Ueno et al. |
| 5,931,918 A | 8/1999 | Row et al. |
| 5,941,972 A | 8/1999 | Hoese et al. |
| 5,963,962 A | 10/1999 | Hitz et al. |
| 5,974,544 A | 10/1999 | Jeffries et al. |
| 6,012,839 A | 1/2000 | Nguyen et al. |
| 6,032,253 A | 2/2000 | Cashman et al. |
| 6,038,570 A | 3/2000 | Hitz et al. |
| 6,065,027 A | 5/2000 | Cashman et al. |
| 6,065,037 A | 5/2000 | Hitz et al. |
| 6,092,215 A | 7/2000 | Hodges et al. |
| 6,138,125 A | 10/2000 | DeMoss |
| 6,138,201 A | 10/2000 | Rebalski |
| 6,144,999 A | 11/2000 | Khalidi et al. |
| 6,157,955 A | 12/2000 | Narad et al. |
| 6,158,017 A | 12/2000 | Han et al. |
| 6,172,990 B1 | 1/2001 | Deb et al. |
| 6,175,915 B1 | 1/2001 | Cashman et al. |
| 6,192,491 B1 | 2/2001 | Cashman et al. |
| 6,205,487 B1 | 3/2001 | Cashman et al. |
| 6,209,087 B1 | 3/2001 | Cashman et al. |
| 6,212,569 B1 | 4/2001 | Cashman et al. |
| 6,223,300 B1 | 4/2001 | Gotoh |
| 6,233,108 B1 | 5/2001 | Inoue |
| 6,282,670 B1 | 8/2001 | Rezaul Islam et al. |
| 6,356,999 B1 | 3/2002 | Cashman et al. |
| 6,425,035 B2 | 7/2002 | Hoese et al. |
| 6,434,711 B1 | 8/2002 | Takiyanagi |
| 6,438,678 B1 | 8/2002 | Cashman et al. |
| 6,442,711 B1 | 8/2002 | Sasamoto et al. |
| 6,467,060 B1 | 10/2002 | Malakapalli et al. |
| 6,502,205 B1 | 12/2002 | Yanai et al. |
| 6,519,733 B1 | 2/2003 | Har et al. |
| 6,532,548 B1 | 3/2003 | Hughes |
| 6,581,185 B1 | 6/2003 | Hughes |
| 6,598,086 B1 | 7/2003 | Bell et al. |
| 6,654,889 B1 | 11/2003 | Trimberger |
| 6,711,693 B1 | 3/2004 | Golden et al. |
| 6,854,071 B2 | 2/2005 | King et al. |
| 6,920,154 B1 | 7/2005 | Achler |
| 6,950,966 B2 | 9/2005 | Chiquoine et al. |
| 6,983,353 B2 | 1/2006 | Tamer et al. |
| 6,985,499 B2 | 1/2006 | Elliot |
| 6,993,701 B2 | 1/2006 | Corbett et al. |
| 7,020,160 B1 | 3/2006 | Achler |
| 7,024,584 B2 | 4/2006 | Boyd et al. |
| 7,055,057 B2 | 5/2006 | Achiwa |
| 7,089,391 B2 | 8/2006 | Geiger et al. |
| 7,152,077 B2 | 12/2006 | Veitch et al. |
| 7,180,909 B1 | 2/2007 | Achler |
| 7,203,732 B2 | 4/2007 | McCabe et al. |
| 7,246,203 B2 | 7/2007 | Moat et al. |
| 7,269,713 B2 | 9/2007 | Anderson et al. |
| 7,278,049 B2 | 10/2007 | Bartfai et al. |
| 7,324,547 B1 | 1/2008 | Alfieri et al. |
| 7,343,460 B2 | 3/2008 | Poston |
| 7,362,772 B1 | 4/2008 | Alfieri et al. |
| 7,380,081 B2 | 5/2008 | Ji et al. |
| RE40,405 E | 6/2008 | Schwartz et al. |
| 7,397,797 B2 | 7/2008 | Alfieri et al. |
| 7,418,368 B2 | 8/2008 | Kim et al. |
| 7,467,168 B2 | 12/2008 | Kern et al. |
| 7,467,265 B1 | 12/2008 | Tawri et al. |
| 7,475,207 B2 | 1/2009 | Bromling et al. |
| 7,529,885 B2 | 5/2009 | Kimura et al. |
| 7,539,976 B1 | 5/2009 | Ousterhout et al. |
| 7,546,469 B2 | 6/2009 | Suzuki et al. |
| 7,571,268 B2 | 8/2009 | Kern et al. |
| 7,581,064 B1 | 8/2009 | Zedlewski et al. |
| 7,624,109 B2 | 11/2009 | Testardi |
| 7,720,801 B2 | 5/2010 | Chen |
| 8,015,427 B2 | 9/2011 | Miller et al. |
| 8,196,147 B1 | 6/2012 | Srinivasan |
| 8,621,184 B1 | 12/2013 | Radhakrishnan et al. |
| 2002/0048364 A1 | 4/2002 | Gligor et al. |
| 2002/0091914 A1 * | 7/2002 | Merchant et al. ............ 712/219 |
| 2003/0093623 A1 | 5/2003 | Crook et al. |
| 2003/0204759 A1 | 10/2003 | Singh |
| 2005/0050115 A1 | 3/2005 | Kekre |
| 2005/0154786 A1 | 7/2005 | Shackelford |
| 2006/0006918 A1 | 1/2006 | Saint-Laurent |
| 2006/0015507 A1 | 1/2006 | Butterworth et al. |
| 2006/0039465 A1 | 2/2006 | Emerson et al. |
| 2007/0079079 A1 | 4/2007 | Li et al. |
| 2007/0156963 A1 | 7/2007 | Chen et al. |
| 2007/0165549 A1 | 7/2007 | Surek et al. |
| 2007/0174411 A1 | 7/2007 | Brokenshire et al. |
| 2008/0005357 A1 | 1/2008 | Malkhi et al. |
| 2008/0104325 A1 | 5/2008 | Narad et al. |
| 2008/0162594 A1 | 7/2008 | Poston |
| 2008/0243951 A1 | 10/2008 | Webman et al. |
| 2008/0243952 A1 | 10/2008 | Webman et al. |
| 2008/0288646 A1 | 11/2008 | Hasha et al. |
| 2009/0327818 A1 | 12/2009 | Kogelnik |
| 2010/0070730 A1 | 3/2010 | Pop et al. |
| 2014/0109101 A1 | 4/2014 | Radhakrishnan et al. |

OTHER PUBLICATIONS

Gibson, Garth A., et al., Coding Techniques for Handling Failures in Large Disk Arrays, Technical Report UCB/CSD 88/477, Computer Science Division, University of California, Jul., 1988.

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Hitz, Dave et al., File System Design for an NFS File Server Appliance, Technical Report 3002, Rev. C395, presented Jan. 19, 1994, 23 pages.

(56) References Cited

OTHER PUBLICATIONS

Katz, Randy H. et al., Disk System Architectures for High Performance Computing, Proceedings of the IEEE, vol. 77, No. 12, pp. 1842-1858, Dec. 1989.

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Patterson, D., et al., A Case for Redundant Arrays of Inexpensive Disks (RAID), SIGMOND International Conference on Management of Data, Chicago, IL, USA, Jun. 1-3, 1988, SIGMOND Record (17):3:109-16 (Sep. 1988).

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

High Performance Voting for Data Encription Standard Engine Data Integrity and Reliability, IBM Technical Disclosure Bulletin, Nov. 1, 1993 (19931101), vol. 36, Issue #11, pp. 189-192.

Gregory, T. Byrd, Producer-Consumer Communication in Distributed Shared Memory Multiprocessors, 1999.

Abdel-Shafi, Hazim, et al., "An Evaluation of Fine-Grain Producer-Initiated Communication in Cache-Coherent Multiprocessors", IEEE Proceedings of the Third International Symposium on High Performance Computer Architecture, Feb. 1997, San Antonio, TX, 8 pages.

Zhang et al., "VCluster: a thread-based Java middleware for SMP and heterogeneous clusters with thread migration support", Nov. 21, 2007, Wiley InterScience.

Salehi et al, "The performance impact of scheduling for cache affinity in parallel network processing," Issue date: Aug. 2-4, 1995, pp. 66-77.

Mills, David L., "Network Time Protocol (version 3) Specification, Implementation and Analysis," Network Working Group, XP002935527, Mar. 1, 1992, pp. i-vii and 1-113.

Network Appliance, Inc., "Notification of Transmittal of the International Search Report and the Written Opinion of the International Searching Authority, or the Declaration," International Filing Date: Mar. 19, 2008, International Application No. PCT/US2008/003554, Date of Mailing: Aug. 26, 2008, pp. 1-14.

Network Appliance, Inc., "Notification of Transmittal of the International Search Report and the Written Opinion of the International Searching Authority, or the Declaration," International Filing Date: Mar. 19, 2008, International Application No. PCT/US2008/003612, Date of Mailing: Nov. 5, 2008, pp. 1-17.

Network Appliance, Inc., "Notification of Transmittal of the International Search Report and the Written Opinion of the International Searching Authority, or the Declaration," International Filing Date: Mar. 20, 2008, International Application No. PCT/US2008/003692, Date of Mailing: Nov. 5, 2008, pp. 1-17.

PCT Notification of Transmittal of the International Search Report and the Written Opinion of the International Searching Authority, or the Declaration, International Application No. PCT/US2008/004766, International Filing Date: Apr. 14, 2008, Date of Mailing of Document: May 12, 2009, 17 pages.

Isci, Canturk, et al., "An Analysis of Efficient Multi-Core Global Power Management Policies: Maximizing Performance for a Given Power Budget", the $39^{th}$ Annual IEEE/ACM International Symposium on Microarchitecture (MICRO '06), Dec. 1, 2006, 12 pages.

Oklobdzija, Vojin G., "The Computer Engineering Handbook", CRC Press, 2002, ISBN: 0849308852, 9780849308857, pp. 8-23-8-25.

* cited by examiner

SYSTEM HAVING OPERATION QUEUES CORRESPONDING TO OPERATION EXECUTION TIME

FIELD OF THE INVENTION

The present invention relates to computer processors, and more specifically, to utilizing a plurality of prioritized queues on computer processors.

BACKGROUND OF THE INVENTION

A storage system is a computer that provides storage service relating to the organization of information on writable persistent storage devices, such as memories, tapes, disks or solid state devices, e.g., flash memory, etc. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a logical unit (lun). In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

One noted disadvantage that may arise during use of a security appliance is that certain operations may be long running and may generate a backlog within a processor of the security appliance. For example, execution of performing compression/decompression operations on, e.g., a tape data stream, by the processor may require significant amounts of time. Conversely, execution of single block encryption/decryption operations for data access requests directed to a disk drive may proceed rapidly. However, should a long-running tape compression/decompression operation be loaded onto an operations queue associated with the processor before a block-based encryption/decryption operation, execution of the encryption/decryption operation by the processor may have to wait until such time as the long-running operation completes. This may substantially lower overall throughput and reduce system performance.

SUMMARY OF THE INVENTION

The disadvantages of the prior art are overcome by providing a system and method for utilizing prioritized queues on a computer, such as a security appliance or a second storage system. Illustratively, a plurality of queues is organized on the computer to enable long-running operations to be loaded on (directed to) a long running operation queue, while faster, "short-running" operations are directed to a short running operation queue. The queues may be associated with one or more processors (e.g., processor cores) of the computer to thereby enable improved throughput. When an operation request (e.g., a tape compression operation, an encryption operation, a disk compression operation, etc.) is received at a processor intake of the computer, a determination is made whether the operation contained within the received request is a long-running operation, e.g., a tape compression operation. If so, the operation is placed in the long-running operation queue. The processor core that is associated with the long-running operation queue thereafter removes the operation from the queue and executes the operation. The status of the operation, e.g., operation complete, an error code, etc., is then loaded onto an outgoing long-running operation status queue. The status may subsequently be removed and reported to an initiator of the long-running operation.

Similarly, if a determination is made that the received operation is not a long-running operation, e.g., a compression operation, the operation is placed in a non-long running operation queue. The processor core associated with the short-running operation is queue then removes the operation from the queue and processes the operation. Status information relating to that operation is then loaded onto a short-running status queue. The status may be subsequently removed from the queue and reported to the initiator of the operation. By utilizing a plurality of queues directed to different priorities of operation, overall system throughput may be increased by, among other things, reducing the number of short-running operations that are delayed.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for prioritized queues. Illustratively, a plurality of queues are organized to enable long-running operations to be directed to a long running queue operation, while faster operations are directed to a non-long running operation queue. Queues may be associated with one or more of a plurality of processor cores to therefore enable improved throughput operations. When an operation request is received, a determination is made whether it is a long-running operation, e.g., a tape compression operation. If so, the operation is placed in a long-running operation queue. When the processor core that is executing long-running operations is ready for the next operation, it removes an operation from the long-running operation queue and processes the operation. The status of the operation is then placed in an outgoing long-running operation status queue. The status may then be removed and reported to the initiator of the long-running operation.

Similarly, if a determination is made that the received operation is not a long-running operation, e.g., a compression operation, the operation is placed in a non-long running operation queue. The processor core executing non-long-running operations then removes the operation from the queue and processes the operation. Status information relating to the operation is then placed in a non-long-running status queue. The status may then be removed from the queue and reported back to the initiator of the operation. By utilizing a plurality of queues directed to different priorities of operation, overall system throughput may be increased and the number of non-long-running operations that are delayed may be reduced.

A. Security Appliance Environment

Figure 1:
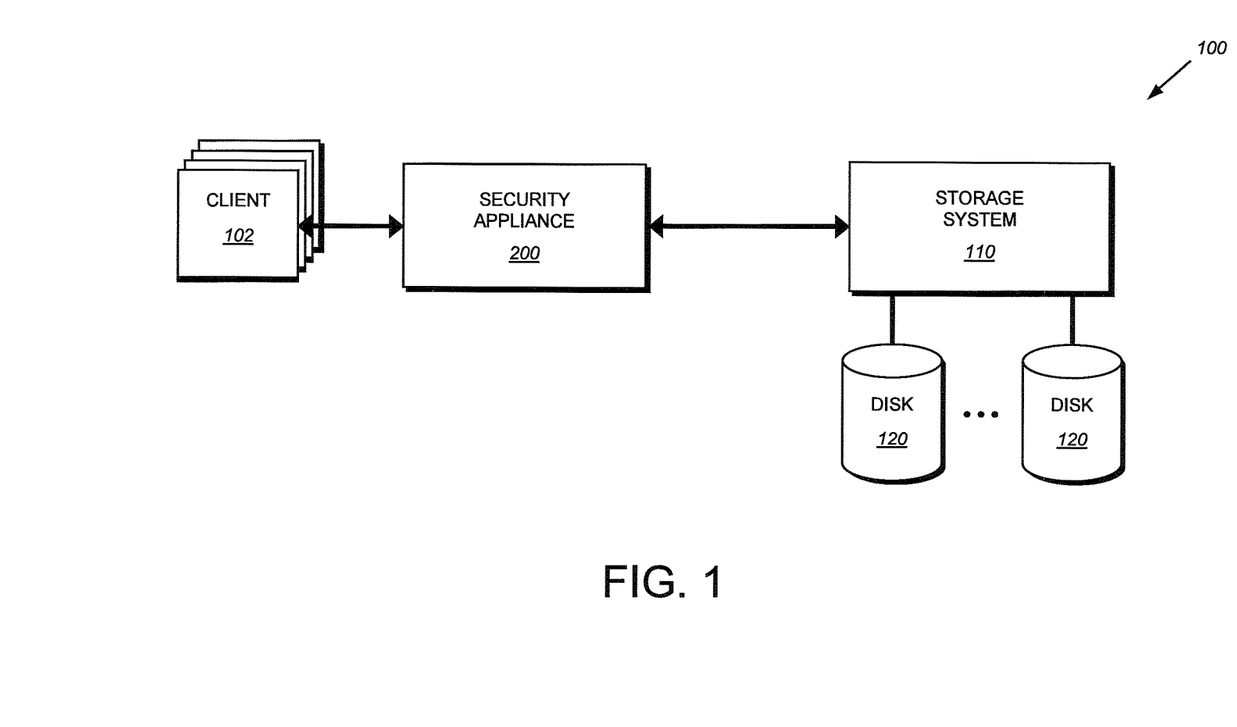
FIG. 1 is a schematic block diagram of an environment including a security appliance in accordance with an illustrative embodiment of the present invention.

FIG. 1 is a schematic block diagram of an exemplary environment 100 including a multi-protocol security appliance 200 that may be advantageously used with an illustrative embodiment of the present invention. The security appliance 200 is illustratively coupled between one or more clients 102 and one or more storage systems 110 although, in alternative embodiments, the security appliance (or its functionality) may be embodied on/in the storage system to thereby provide a secure storage system. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Illustratively, the clients 102 may comprise application service providers, virtual tape systems, etc. Thus, in accordance with an illustrative embodiment of the present invention, clients 102 may send a plurality of types of operations to the security appliance 200. For example, a client may send one or more block-based encryption/decryption operations directed to a logical unit number (lun) or may transmit one or more compression/decompression operations directed to a virtual tape stream.

B. Security Appliance

Figure 2:
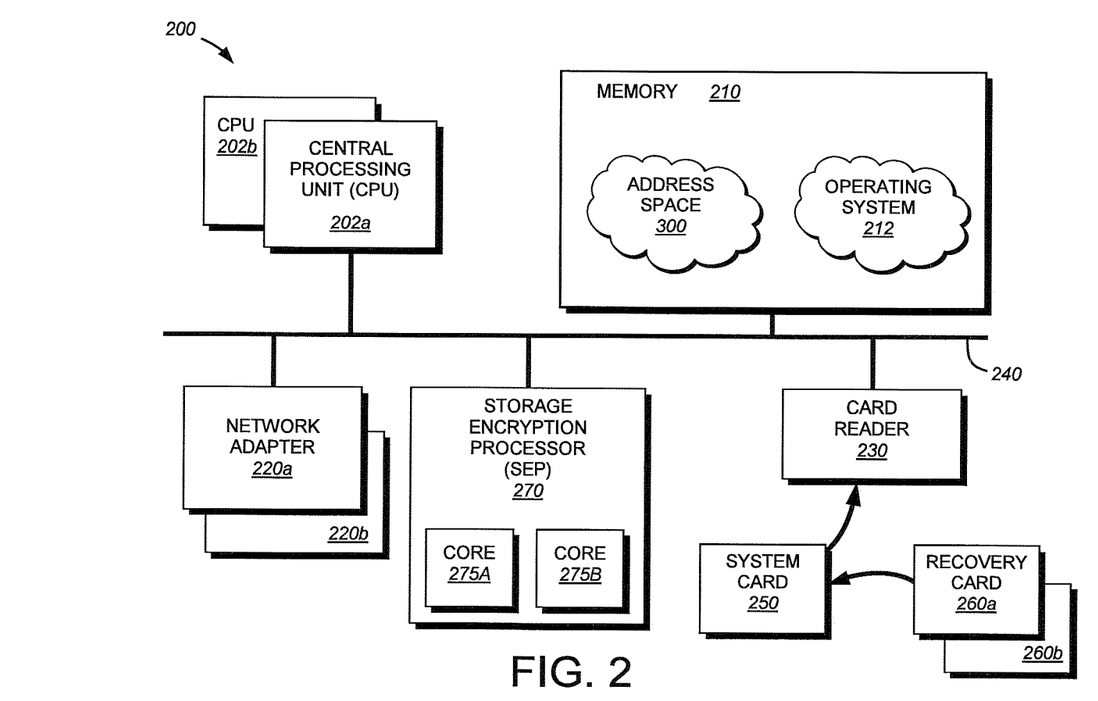
FIG. 2 is a schematic block diagram of a security appliance in accordance with an illustrative embodiment of the present invention semi.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a storage encryption processor (SEP 270) and a card reader 230 interconnected by a system bus 240, such as a conventional Peripheral Component Interconnect (PCI) bus. The SEP 270 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module.

In accordance with the illustrative embodiment of the present invention, the SEP 270 includes a plurality of processor cores 275 A, B. It should be noted that two cores are shown for illustrative purposes only. In accordance with alternative embodiments of the present invention, the SEP 270 may have any number of the processor cores including, for example, a single processor core. As such, the depiction of the SEP 270 having two processor cores 275 A, B should be taken as exemplary only. Furthermore, while one SEP 270 is shown in FIG. 2, the principles of the present invention may be utilized in systems having any number of SEPs. As such, the description of a single SEP 270 should be taken as exemplary only.

Since the SEP 270 protects encryption keys from being "touched" (processed) by the system software executing on the CPU 202, a mechanism is needed to load keys into and retrieve keys from the SEP. To that end, the card reader 230 provides an interface between a "smart" system card 250 and the SEP 270 for purposes of exchanging encryption keys. Illustratively, the system card is a FIPS 140-2 level-3 certified card that is configured with customized software code. The security appliance (and card reader 230) are further configured to support additional smart cards referred to as recovery cards 260a,b. The security appliance illustratively supports up to 40 recovery cards with a default value of, e.g., 5 recovery cards, although any number of cards can be supported based on the particular security policy.

Operationally, encryption keys are exchanged between the SEP 270 and system card 250, where they are "secret shared" (cryptographically assigned) to the recovery cards 260 as recovery keys, as described herein. These recovery keys can thereafter be applied (via the recovery cards) to the security appliance 200 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys.

The network adapters 220 couple the security appliance 200 between one or more clients 102 and one or more storage systems 110 over point-to-point links, wide area networks and virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that is other processing and memory means, including various computer readable media, may be used for storing and executing program instructions pertaining to the invention described herein.

Figure 3:
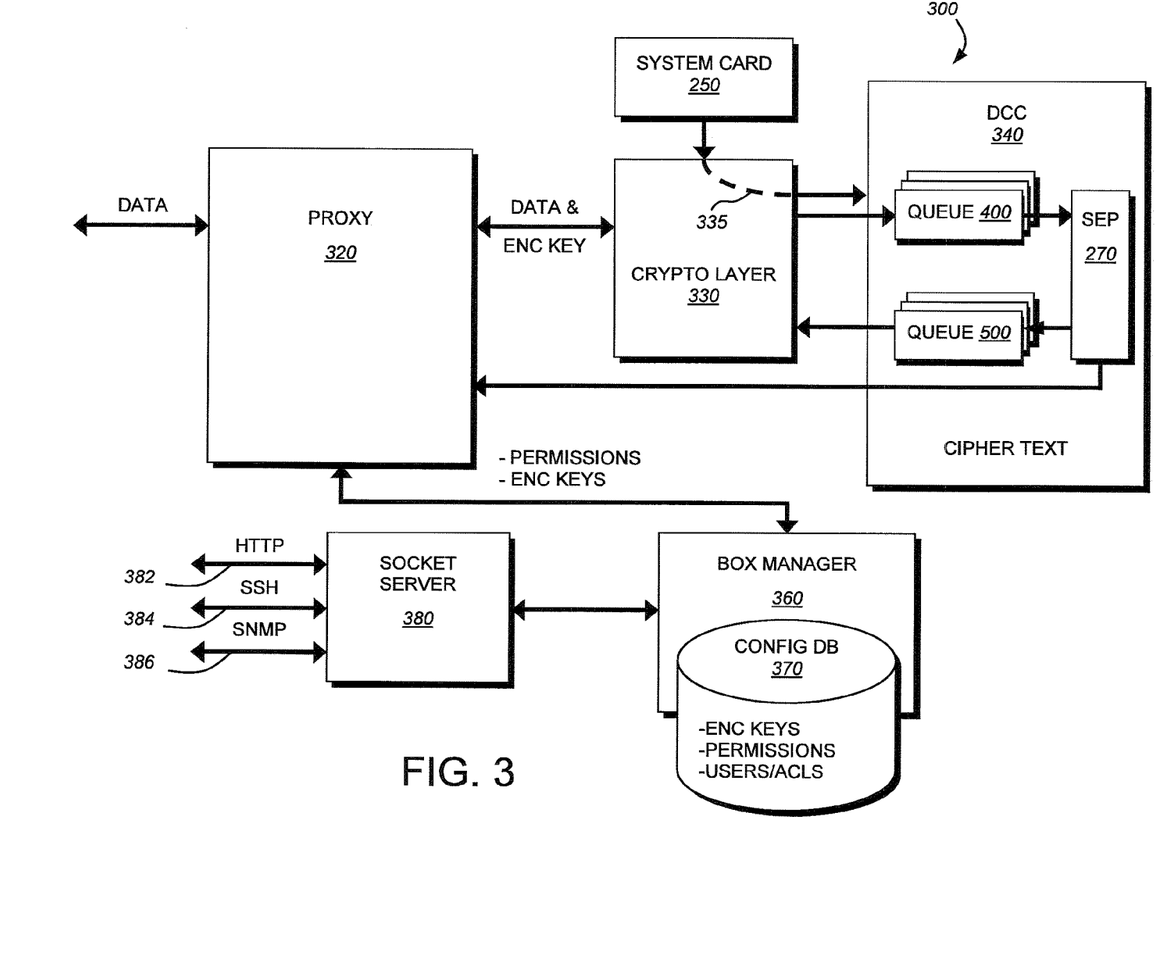
FIG. 3 is a schematic block diagram illustrating an arrangement of software processes and modules executing on a security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be utilized in alternate embodiments of the present invention.

For both NAS and SAN environments, data is received at a proxy 320 of the security appliance. The proxy 320 is a kernel module embodied as, e.g., the network protocol stack configured to interpret the protocol over which data is received and to enforce certain access control rules based on one or more policies. Each policy is served by a box manager 360 that is illustratively embodied as a database application process configured to manage a configuration repository or database (Config DB 370) that stores permissions, access control lists (ACLs), system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries, using, e.g., an interprocess communication (IPC) technique, the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 270. As noted, the SEP resides on an interface card, which is hereinafter referred to a data crypto card (DCC 340).

Figure 4:
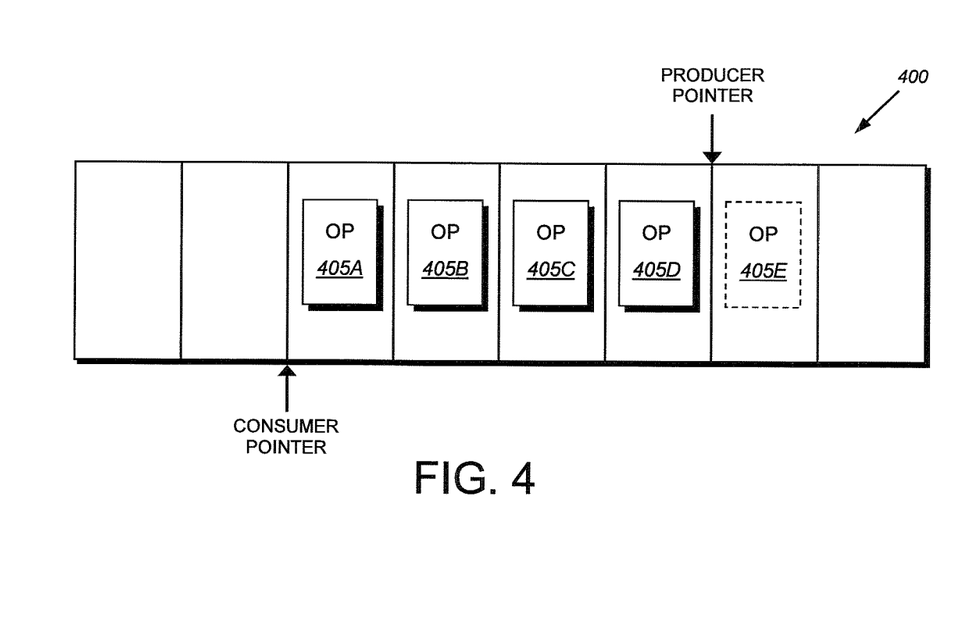
FIG. 4 is a schematic block diagram of an illustrative operation queue in accordance with an illustrative embodiment of the present invention.
Figure 5:
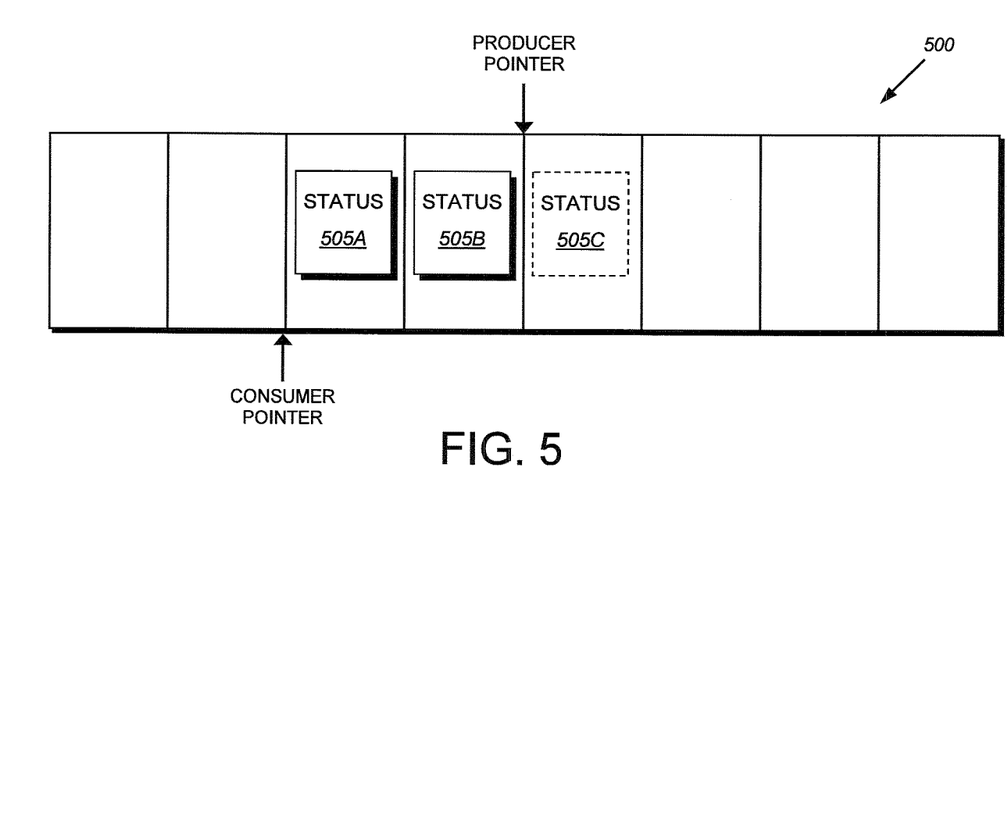
FIG. 5 is a schematic block diagram of an exemplary status queue in accordance with an illustrative embodiment of the present invention.

Illustratively the DCC 340 cooperates with the crypto layer 330 to implement a plurality of prioritize queues, such as operation queues 400 and status queues 500 in accordance with an illustrative embodiment of the present invention. Each operation queue 400 is utilized by the crypto layer 330 to access the DCC 340 by, for example, supplying starting and ending points of data as well as offsets into the data along with the encryption keys used to encrypt data. In accordance with the illustrative embodiment of the present invention, the DCC 340 removes operations from the queue 400 and processes them before placing status indicators in status queue 500. The crypto layer 330 may retrieve status information, e.g., operation complete, error codes, etc., from queue 500 and return the status information to the appropriate initiator of the operation. In an illustrative embodiment, operation requests are received by the crypto layer 330 and enqueued in an operations queue 400 before processing by one of the cores of the SEP 270. The crypto layer or, in alternative embodiments, the DCC 340 determines whether the received operation request is a long running operation. If the operation contained in the received request is a long running operation, e.g., a compression operation, the operation is enqueued in a long running operation queue 400. Otherwise, the operation is enqueued in a short running operation queue 400. In accordance with alternative embodiments, there may be a plurality of long and short running operation queues (and associated status queues 500). Each of the queues may be associated with one or more processor cores in a predefined manner, established by, e.g., the DCC 340, to enable optimized processing of operations. In alternative embodiments, the association of individual queues with specific cores may dynamically change depending on the type of operation mix being processed. It should be noted that in alternative embodiments, queues 400, 500 may be implemented in modules other than DCC 340, e.g. queues 400, 500 may be implemented in crypto layer 330. As such, the description of queues being implemented by DCC 340 should be taken as exemplary only. Furthermore, the method of associating processor cores with queues may vary as will be appreciated by one skilled in the art. Thus, in the illustrative embodiment, the decision as to which processor core 275 an operation is directed is made by the software executing on processor 202. However, in alternative embodiments, this decision may be performed by other modules. As such, this description should be taken as exemplary only.

The crypto layer 330 interacts with the DCC 340 by accessing (reading and writing) registers on the DCC and, to that end, functions as a PCI interface. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate network addresses, e.g., IP addresses, with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses.

C. Prioritized Queues

The present invention provides a system and method for prioritized queues. Illustratively, a plurality of queues are organized to enable long-running operations to be directed to a long running queue operation, while faster operations are directed to a non-long running operation queue. Queues may be associated with one or more of a plurality of processor cores to therefore enable improved throughput operations. When an operation request is received, a determination is made whether it is a long-running operation, e.g., a tape compression operation. If so, the operation is placed in a long-running operation queue. When the processor core that is executing long-running operations is ready for the next operation, it removes an operation from the long-running operation queue and processes the operation. The status of the operation is then placed in an outgoing long-running operation status queue. The status may then be removed and reported to the is initiator of the long-running operation.

Similarly, if a determination is made that the received operation is not a long-running operation, e.g., a compression operation, the operation is placed in a non-long running operation queue. The processor core executing non-long-running operations then removes the operation from the queue and processes the operation. Status information relating to the operation is then placed in a non-long-running status queue. The status may then be removed from the queue and reported back to the initiator of the operation. By utilizing a plurality of queues directed to different priorities of operation, overall system throughput may be increased and the number of non-long-running operations that are delayed may be reduced.

FIG. 4 is a schematic block diagram of an exemplary operation queue 400 in accordance with an illustrative embodiment of the present invention. The queue 400 is illustratively utilized by the crypto layer 330 to enqueue operations for processing by the SEP (or one or more cores) therein. Illustratively, a plurality of operation queues 400 may be utilized in accordance with the teachings of the present invention. Two pointers are illustratively maintained for each queue, e.g., a producer pointer and a consumer pointer. The producer pointer signifies the location where the next operation is to be enqueued, while the consumer pointer signifies the location of the operation that is to be next removed from the queue for processing. Thus, in the example shown in FIG. 4, four operations are enqueued, e.g., operations 405 A-D. The consumer pointer signifies that the next operation to be removed from the queue for processing is operation 405 A. Similarly, the producer pointer indicates that the next operation to be enqueued will be inserted as operation 405E. It should be noted that illustratively the queue 400 is a "wrap around" queue so that when the producer and/or consumer pointer reaches the last the entry of the queue, it utilizes the first entry as a next entry. It should be noted that in alternative embodiments other implementations of an operations queue 400 may be utilized. As such, the description herein should be taken as exemplary only.

FIG. 5 is a schematic block diagram of an exemplary status queue 500 in accordance with an illustrative embodiment of the present invention. Similar to the operations queue 400, the status queue includes a producer pointer and a consumer pointer. In relation to the status queue 500, the producer pointer signifies the next location where the next status information is to be inserted by the data crypto card 340. The consumer pointer signifies the next status entry that is to be read and returned to the initiator in accordance with an illustrative embodiment of the present invention. As used herein, an initiator is a client or process that initiates an operation request and to which status information is directed. Thus, in the example shown in FIG. 5, there are two status entries 505A, B enqueued within status queue 500. The consumer pointer points to status entry 505A, which will be the next status entry returned to an initiator. The producer entry points to a location where status entry 505C will be enqueued once the next operation has been completed.

Figure 6:
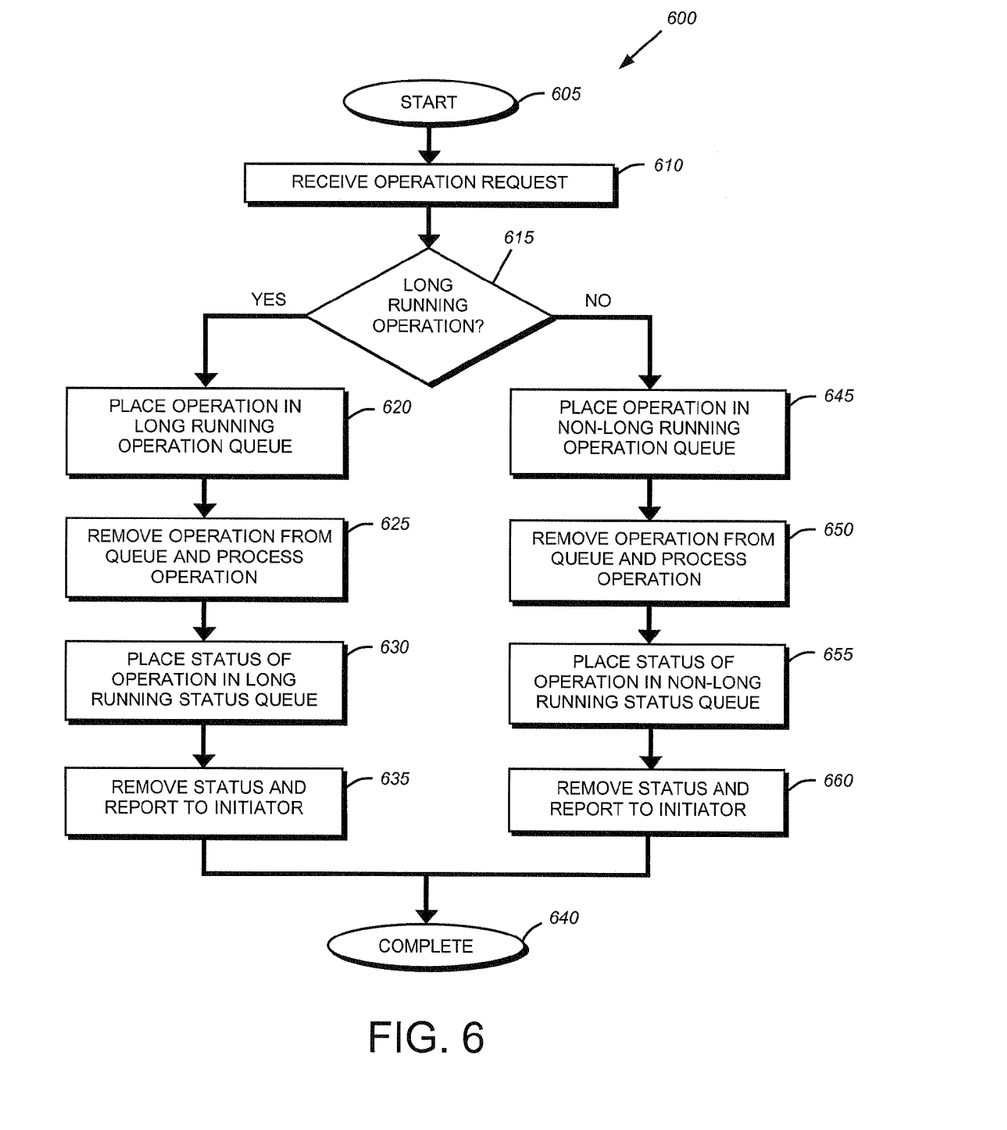
FIG. 6 is a flow chart detailing the steps of a procedure for utilizing prioritized queues in accordance with an illustrative embodiment of the present invention.

FIG. 6 is a flow chart detailing the steps of a procedure for utilizing prioritized queues in accordance with an illustrative embodiment of the present invention. The procedure 600 begins in step 605 and continues to step 610 where an operation request is received by, e.g., the crypto layer 330 of a computer, such as security appliance 210. A determination is made in step 615 whether the received operation request contains a long-running operation. Illustratively, this determination is made by the crypto layer 330; however, in alternative embodiments, this determination may be made by other modules of the computer.

If the operation received is a long-running operation, the procedure continues to step 620 where the received operation is placed in a long-running operation queue. At a later point in time, the operation is removed from the long-running operation queue and processed by one or more cores of the SEP in step 625. The status of the operation is then placed on a long-running status queue in step 630. The status is then removed from the long-running status queue and reported to the initiator in step 635. The procedure 600 then completes in step 640.

However, if in step 615 it is determined that the operation is not a long-running operation, then the procedure branches to step 645 where the received operation is placed on a non-long-running (i.e., short-running) operation queue. A SEP core removes the operation from the queue and processes the operation in step 650. The status of the processed operation is then placed on a non-long running status queue in step 655. The status is then removed from the queue and reported to the initiator in step 660 before the procedure completes in step 640.

To again summarize, the present invention enables a plurality of operation queues to be configured in a defined system arrangement with one or more processor cores. Upon receiving an operation request, the system enqueues the operation onto one of the queues based upon one or more characteristics of the operation. Illustratively, the characteristic is whether the operation is a long running operation. However, it should be noted that in alternative embodiments, additional and/or differing characteristics may be utilized. Once enqueued, the operation is subsequently processed by one of the processor cores that is illustratively configured to process (execute) operations having a certain characteristic. In alternative embodiments, the association of processor cores and queues may be dynamically modified depending on, e.g., the operation types and quantities that are being received by the system.

The foregoing description has been directed to specific embodiments of this invention. It will be apparent; however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for processing operations using a plurality of queues of a computer, the method comprising:
    receiving, at a processor intake of the computer, a request;
    determining, when the request is received at the processor intake, whether an operation within the request is directed to a long running operation based on an amount of time required by a processor to execute the operation within the request;
    placing, in response to determining that the operation is directed to the long running operation, the operation on a long running operation queue from the plurality of queues, wherein a first processing core of the processor is associated with the long running operation queue; and
    placing, in response to determining that the operation is not directed to the long running operation, the operation on a non-long running operation queue from the plurality of queues, wherein a second processing core of the processor is associated with the non-long running operation queue.

2. The method of claim 1 further comprising:
    removing the operation from the long running operation queue by the first processing core;
    processing the operation by the first processing core; and
    placing, on a long running operation status queue, a status indicator of the processed operation.

3. The method of claim 1 further comprising:
    removing the operation from the non-long running operation queue by the second processing core;
    processing the operation by the second processing core; and
    placing, on a non-long running operation status queue, a status indicator of the processed operation.

4. The method of claim 1 wherein the operation comprises a compression operation.

5. The method of claim 1 wherein the operation comprises an encryption operation.

6. A system for processing operations using a plurality of queues of a computer, the system comprising:
    means for receiving, at a processor intake, a request;
    means for determining, when the request is received at the processor intake, whether an operation within the request is directed to a long running operation based on an amount of time required by a processor to execute the operation;
    means for placing, in response to determining that the operation is directed to the long running operation, the operation on a long running operation queue associated with a first processing core; and
    means for placing, in response to determining that the operation is not directed to the long running operation, the operation on a non-long running operation queue associated with a second processing core.

7. A non-transitory computer readable medium containing executable program instructions executed by a processor, comprising:
    program instructions that receive, at a processor intake of a computer, a request;
    program instructions that determine, when the request is received at the processor intake, whether an operation within the request is directed to a long running operation based on an amount of time required to execute the operation;
    program instructions that place, in response to determining that the operation is directed to the long running operation, the operation on a long running operation queue associated with a first processing core; and
    program instructions that place, in response to determining that the operation is not directed to the long running operation, the operation on a non-long running operation queue associated with a second processing core.

8. A system for processing operation requests, the system comprising:
    a processor having one or more processor cores;
    one or more long running operation queues operatively interconnected with the processor, the one or more long running operation queues configured to store a first set of operation requests to be processed by a first set of the one or more of the processor cores;
    one or more non-long running operation queues operatively interconnected with the processor, the one or more non-long running operation queues configured to store a second set of operation requests to be processed by a second set of one or more of the processor cores; and
    a memory coupled to the processor and configured to store software executed by the processor, the software when executed operable to:
    receive a request,
    determine, when the request is received at a processor intake, whether an operation within the request is directed to a long running operation based on an amount of time required by the processor to execute the operation, and place, in response to determining that the operation is directed to the long running operation, the operation in one of the long running operation queues.

9. The system of claim 8 wherein the software is further configured to:
    determine, when the request is received at the processor intake, whether the operation is directed to a non-long running operation based on the amount of time required by the processor to execute the operation, and
    place, in response to determining that the operation is directed to the non-long running operation, the operation in one of the non-long running operation queues.

10. The system of claim 8 wherein the operation comprises a compression operation.

11. The system of claim 8 wherein the operation comprises an encryption operation.

12. The system of claim 8 wherein the first set of one or more processor cores is configured to remove a queued operation from the long running operation queue and process the removed queued operation.

13. The system of claim 12 wherein the first set of one or more processor cores is further configured to place a status indicator in a long running operation status queue.

14. The system of claim 8 wherein the second set of one or more processor cores is configured to remove a queued operation from the non-long running operation queue and process the removed queued operation.

15. The system of claim 14 wherein the second set of one or more processor cores is further configured to place a status indicator in a non-long running operation status queue.

16. A method for processing operations using a plurality of queues of a computer having a processor, the method comprising:
   generating, by a module of the computer, an operation request;
   forwarding the generated operation request to a storage encryption processor for execution;
   determining, when the operation request is received at the storage encryption processor, whether the generated operation request is directed to a long running operation based on an amount of time required by the processor to execute the operation;
   placing, in response to determining that the operation request received at the storage encryption processor is directed to the long running operation, the operation on a long running operation queue selected from the plurality of queues, wherein the long running operation queue is associated with a first core of the storage encryption processor; and
   placing, in response to determining that the operation request received at the storage encryption processor is not directed to the long running operation, the operation request on a non-long running operation queue selected from the plurality of queues, wherein the non-long running operation queue is associated with a second core of the storage encryption processor.

17. The method of claim 16 further comprising:
   removing the operation from the long running operation queue by the first core;
   processing the operation by the first core of the storage encryption processor; and
   placing, on a long running operation status queue, an indicator that the operation was processed.

* * * * *